United States Patent [19]

Chau

[11] Patent Number: 5,070,462

[45] Date of Patent: Dec. 3, 1991

[54] DEVICE FOR LOCATING A BORING MACHINE

[75] Inventor: Albert W. Chau, Redmond, Wash.

[73] Assignee: FlowMole Corporation, Kent, Wash.

[21] Appl. No.: 406,769

[22] Filed: Sep. 12, 1989

[51] Int. Cl.⁵ .............................................. G01S 5/04
[52] U.S. Cl. .................................... 364/460; 364/561; 342/448
[58] Field of Search ................. 340/368, 686; 324/326, 324/346, 333, 338; 364/559, 516, 517, 560, 561, 460; 342/448; 328/167; 370/112

[56] References Cited

U.S. PATENT DOCUMENTS

| | | | |
|---|---|---|---|
| 4,659,996 | 4/1987 | Nadir | 328/167 |
| 4,688,037 | 4/1987 | Krieg | 340/686 |
| 4,737,794 | 12/1988 | Jones | 342/448 |
| 4,805,165 | 2/1989 | Kawamura et al. | 370/112 |
| 4,806,869 | 2/1989 | Chau et al. | 324/326 |

OTHER PUBLICATIONS

Radio Electronics, Doug Krause, Automobile Locater, 04/82, p. 32.

Primary Examiner—Thomas G. Black
Attorney, Agent, or Firm—Flehr, Hohbach, Test, Albritton & Herbert

[57] ABSTRACT

An assembly is disclosed herein for locating an underground object that is transmitting a relatively low frequency signal electromagentic field. Means are provided for scanning the earth's surface and homing in on the point where the magnetic field is strongest, and at that point, calculating the depth of the object based on the strength of the magnetic field.

20 Claims, 3 Drawing Sheets

DEVICE FOR LOCATING A BORING MACHINE

The present invention relates generally to a device capable of locating an object transmitting an electromagnetic field. More particularly, the present invention relates to a device capable of locating an underground object that is transmitting an electromagnetic field by scanning the earth's surface and homing in on the point where the magnetic field is strongest, and at that point, calculating the depth of the object based on the strength of the electromagnetic field.

BACKGROUND OF THE INVENTION

For underground construction and mining projects, boring machines are used to tunnel holes and displace soil below the earth's surface. It is essential for workers on the surface above the boring site to have knowledge of the bore machine's locations and its depth below the surface. Devices which approximate the surface location and depth of a boring machine are available in the prior art.

Prior art location devices, for example, the device of U.S. Pat. No. 4,806,869, include an assembly comprised of an oscillating magnetic dipole transmitter, a receiver and a display indicator. The magnetic dipole is affixed to the boring machine and is used to generate an electromagnetic field. A portable unit containing the receiver and signal processor is utilized above the boring site on the earth's surface. The receiver includes two or more antennas which are physically spaced at a predefined distance apart. Each antenna measures the relative electromagnetic field strengths at its particular position and generates an electrical signal in response thereto. The amplitude of each signal is proportional to the measured electromagnetic field strength and the signal's frequency is equal to that of the magnetic dipole.

To locate the boring machine's position, the signal processor relies on the principle that the electromagnetic field is the strongest at the surface point directly above the bore machine, because at this point, the signal processing device is the closest to the magnetic dipole. During operation, the operator is required to scan the receiver across the earth's surface area in the vicinity above the bore machine for the purpose of pinpointing the site where the magnetic field is the strongest. Once located, the processing device uses the strength of signals to calculate the bore machine's depth.

The algorithm the processor uses to calculate the bore machine's depth is well known in the art. Assuming the antennas generate signals S1 and S2 respectively, each signal is determined by the following equation:

$$S1 = k/d^3, \text{ and} \quad [1]$$

$$S2 = k/(d+L)^3, \quad [2]$$

where k is a constant dependent on the strength of the magnetic oscillator, and L equals the distance between the axes of the antenna.

Solving for the depth (d) of the dipole magnet on the bore machine, the processor uses the following equation:

$$d = L/\{(S1/S2)\wedge(\tfrac{1}{3}) - 1\}. \quad [3]$$

Many of the prior art locating device assemblies operate at a frequency in the range of 30,000 hertz to 100,000 hertz. Signals at frequencies in this range tend to have satisfactory signal-to-noise ratio for accurate processing as contrasted with lower frequency signals.

The use of high frequency magnetic fields, however, have significant undesirable side effects. It is known that too high frequency electromagnetic fields create eddy currents within the metals. The eddy currents in the conductive metals are responsible for generating electromagnetic energy, which can significantly disrupt the magnetic field created by the dipole at the surface. Accordingly, if any metal is present at the boring site, the prior art location devices cannot differentiate between the dipole's electromagnetic field and the electromagnetic field originating from the surrounding metals. As a result, the ability of prior art location devices to pinpoint and calculate the boring devices position and depth is severely impeded.

To combat the problem of stray electromagnetic energy due to the presence of metals at the boring site, more recent location devices have relied on lower frequency dipole oscillators. This, however, leads to its own host of problems. Lower dipole magnet frequencies tend to create a lower signal to noise ratio at the antennas.

A number of noise reduction techniques have been employed in the prior art to eliminate some of the low frequency noise. One noise reduction technique employed in U.S. Pat. No. 4,806,869 is to employ for each antenna signal (S) a synchronous detector and a programmable gain amplifier (PGA). The synchronous detector modulates the signal (S) with a reference signal to reduce the signal (S) to a very small bandwidth. Since the noise present on the signal (S) is proportional to the square root of the system's bandwidth, noise reduction is achieved. In addition, the PGA amplifies the signal (S) to fulfill the dynamic range requirement of the system.

A number of problems are associated with the noise removal technique described above. The use of a synchronous detector and a PGA for each signal results in unavoidable thermal drifts, gain errors, modulation errors and significant measurement flaws between any two signals (S1 and S2 for example). The locating device's ability to accurately pinpoint the boring device's location beneath the surface and to calculate its depth is significantly impeded when inaccurate values between S1 and S2 are obtained with respect to one another.

SUMMARY OF THE INVENTION

Accordingly, it is a primary object of the present invention to provide a device capable of locating an underground object that is generating an electromagnetic field by scanning the surface and homing in on the point where the magnetic field is strongest, and at that point, calculating the depth of the object by measuring the strength of the magnetic field.

Another object of the present invention is to provide in the location device a means to handle in continuous time a plurality of signals indicative of the electromagnetic field strength using a single synchronous detector and programmable gain amplifier for the purpose of removing unavoidable thermal drifts, gain errors and modulation errors between the plurality of signals.

Another object of the present invention is to provide in the device a means for calculating and displaying first order (real time) information about the object's location as the locating device is being used and second and third order (delayed) information for more accurate readings.

To achieve the foregoing and other objects in accordance with the purpose of the present invention, there is provided an assembly for locating the position of an object. The assembly includes: a first means located at the object for generating an electromagnetic field at a given frequency and a second means remote from the transmitting means which includes first and second signal receiving antennas located a fixed distance apart for simultaneously producing continuous first and second electrical signals. The received signals contain relatively high noise and have AC components which are equal to the given frequency and which have amplitudes proportional to the strength of said field at said first and second antennas, respectively. The device also includes signal processing circuitry connected to receive the first and second electrical signals. The processing circuitry includes: a multiplexing means for producing a continuous train of alternating, discrete first and second signal segments from and corresponding to discrete segments from the continuous first and second signal; a single synchronous detector operating on the continuous train of discrete first and second signal segments at a frequency at least approximating the given frequency for substantially reducing the frequency of the AC components of the first and second signal segments; a demultiplexing means for combining the first signal segments and the second signal segments into first and second electrical signals containing relatively high frequency noise and having AC components corresponding to the first mentioned AC components but at a substantially reduced frequency; and a means for filtering out the relatively high frequency noise from the combined first and second signals. A means is provided to act on the filtered out first and second signals for determining therefrom the distance between the object and the antennas.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
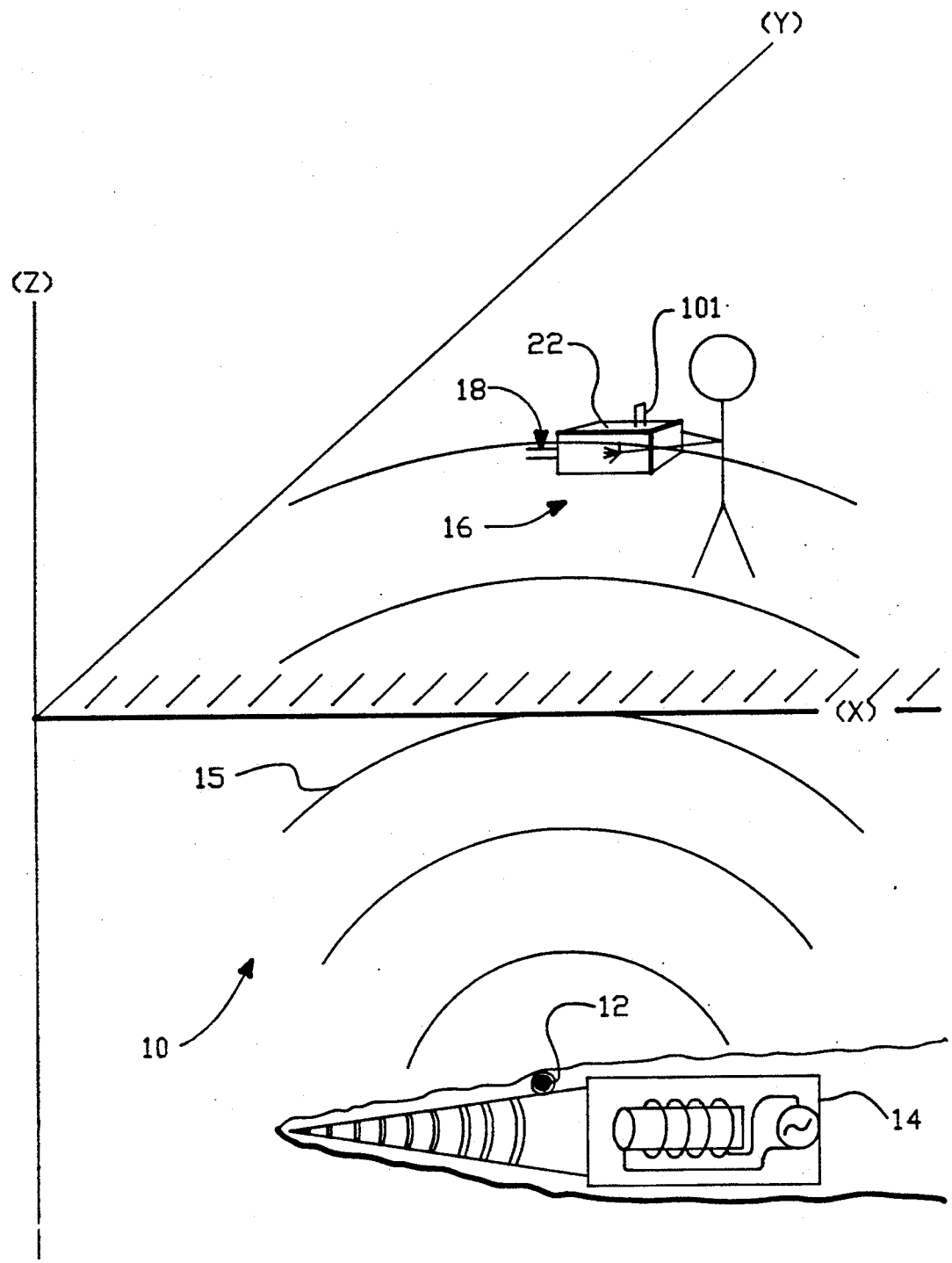
FIG. 1 shows a person operating a locating assembly device of the present invention within a three dimensional coordinate system wherein the earth's surface is defined along the (X,Y) plane and the boring machine is operating below the earth's surface at a depth defined along the (Z) axis.

Reference is initially made to FIG. 1 which shows a person operating a location assembly device 10 of the present invention within a three dimensional (X,Y,Z) coordinate system. The earth's surface is defined along the (X,Y) plane and the boring machine whose location and depth are to be determined is operating below the earth's surface at a depth defined by the (Z) axis.

The assembly 10 includes a magnetic dipole 12 attached to the boring machine 14. The magnetic dipole generates a magnetic field 15 pulsating at a frequency equal to W1, preferably a relatively low frequency not greater than 1000 hertz. The remainder of the assembly includes a portable carrying case 16 containing a receiver 18, a signal processor 20 (see FIG. 2) and a display face 22. The case 16 is adapted to be carried by a person and is used to scan and measure the surface strength of the electromagnetic field 15 in the area above the boring machine. The dipole's electromagnetic field provides a homing signal to the receiver 18, which in turn generates electromagnetic field strength signals for the signal processor in response thereto.

The operation of the location assembly is herein briefly described. Once boring commences underground, the machine 14 is no longer visible on the earth's surface. To keep track of the boring machines position, the worker operating the location assembly is required to scan the portable case 16 above the surface area of the earth defined by the (X,Y) plane in the vicinity of the boring operation. The electromagnetic field strength signal is continuously received by receiver 18 and processed by processor 20 to yield a real time magnetic field amplitude value which is then presented on display 22. The relative strength of the magnetic field provides a homing signal for the worker to locate the (X,Y) coordinate where the magnetic field is the strongest on the earth's surface.

The (X,Y) surface coordinate where the highest field strength reading is obtained corresponds to the point directly above the boring machine 14. To determine the depth of the boring machine, the processor relies on the algorithm described in the prior art to calculate the depth based on the relative magnetic field strength at this point. The calculated real time depth value is also presented to the worker on display face 22.

Describing the present invention in greater detail, prior to implementation of the present invention, magnetic dipole magnet 12 is installed onto the boring machine 14. During underground operation of the bore machine, the magnetic dipole 12 generates an electromagnetic field oscillating at the predetermined frequency W1. The magnetic field radiates outward in all directions from the dipole magnet, including upward toward the carrying case 16 containing the receiver 18 and processor 20 on the earth's surface. In the preferred embodiment, the recommended frequency is not greater than 1000 hertz. It would be obvious to those skilled in the art to use a frequency in the range of several kilohertz.

Figure 2:
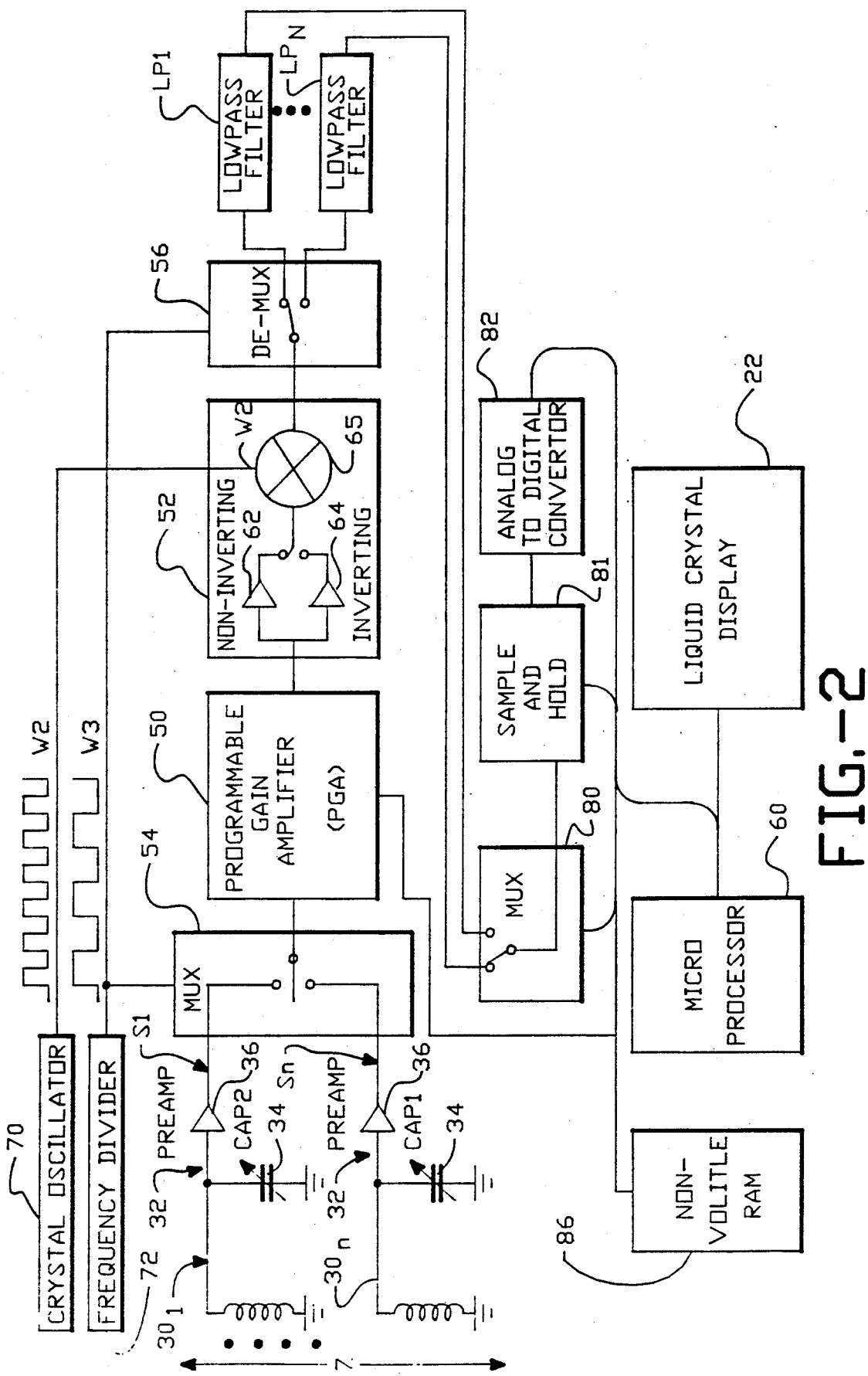
FIG. 2 is a circuit diagram of the locating device in FIG. 1 showing a plurality of antennas, a single programmable gain amplifier, a single synchronous detector for removing unwanted electrical noise from each of the plurality of signals generated by the antennas, and a processor to process the signal information according to the present invention.

Referring now to FIG. 2, a diagram of the circuit making up processor 20 contained in the carrying case 16 is shown according to the present invention. The circuit includes a plurality of antenna loops for generating a plurality of signals indicative of the magnetic field strength, a single programmable gain amplifier, a single synchronous detector and associated filters for removing unwanted electrical noise from all of the plurality of signals, and processor circuitry to process the signal information.

Receiver portion 18 of the circuit comprises a plurality of antennas $30_1$ through $30_n$ which protrude from the external surface of the case and which are separated by a predefined vertical distance along (Z) axis. Each antenna channel includes a loop antenna 30 and a tuned preamplifier 32 comprising a tuning capacitor 34 and a preamplifier 36. Each antenna is responsible for generating an electrical signal S1 through Sn in response to the magnetic field strength present at the respective antennas. The signals exiting the preamplifier stage are plagued with high levels of noise.

The frequency of the signal generated by each antenna is which is equal to that of the magnetic dipole 12 and has an amplitude indicative of the magnetic field strength at that antenna. It should be noted that the amplitude of each signal is different due to the vertical displacement of the antennas with respect to one another and the source of the magnetic dipole field.

A common approach for signal processing in depth and locating devices is to use a programable amplifier and a synchronous detector for each antenna channel. Multiple amplifiers, however, create inaccurate depth calculations due to thermal drifts and gain errors of the programable amplifiers which result in significant measurement errors of S1 through Sn.

Briefly describing the noise reduction portion of the circuit, the present invention relies on a novel time sharing technique to pass each of the noisy antenna signals S1 through Sn through a single programmable gain amplifier (PGA) 50 and a synchronous detector 52. The technique relies on a first multiplexer (MUX) 54 and a demultiplexer (DEMUX) 56 acting in cooperation with one another. After the DEMUXing stage, each signal is returned to its original signal channel and passed through a low pass filter LP1 through LPn, respectively. This time sharing technique eliminates the problems caused by thermal drifts and gain errors.

Describing the noise reduction portion of the circuit in detail, the MUX 54 is electrically coupled to receive the plurality of signals S1 through Sn at its input. The MUX selects one of the signals present on its input and passes it through the PGA 50 and synchronous detector 52. The DEMUX 56 is electrically engaged to receive the signal from the synchronous detector and to return it to its respective output channel. For example, if MUX 54 has selected S2, the DEMUX insures that the signal is passed through to its second output.

The MUX and DEMUX are arranged to select the first signal S1 for a predetermined period of time. After S1 is amplified and modulated, the process is repeated with S2. The MUX and DEMUX sequence through the signals S1 through Sn, and when Sn is completed, the process continuously repeats itself starting at S1. In this manner, MUX 54 creates a continuous train of alternating, discrete signal segments from and corresponding to discrete segments of signals S1 through Sn respectively.

To implement the timing of the MUX and DEMUX, a crystal oscillator 70 is provided. The oscillator 70 operates at a frequency W2 which approximates frequency of the magnetic dipole 12. In the preferred embodiment, W2 is within two hertz of W1. The frequency W2 provides the modulating reference signal for synchronous detector 52.

A frequency divider 72 divides the frequency signal W2 from oscillator 70 by the number equal to "n", thereby generating a third frequency signal W3 operating at approximately a fraction of the frequency W1. Frequency W3 is responsible for providing the timing signals for first MUX 54 and DEMUX 56. For instance with (n=2), frequency W3 is approximately one half W2.

The microprocessor 60 (CPU) is electrically coupled to and is responsible for selecting the proper PGA gain to bias signal amplitude strengths of the signal segments of S1 through Sn. The CPU is required to selectively vary the gain of the signal because the signal's amplitude varies between large and small depths. The use of single PGA to amplify all of the signals eliminates the problem associated with unequal biasing and gain necessarily present if two PGA's were used as described above.

The single synchronous detector 52 includes an inverting and a non-inverting amplifiers 62 and 64 respectively. Amplifier 62 inverts the negative polarity portions of the continuous alternating discrete signal segment train. A summing device 65 adds the positive polarity train comprised of segments from S1, S2 and so on with a modulating reference signal w2. The modulating of the continuous train of discrete signal segments by the synchronous detector 52 results in two discrete spectrums (W1+W2) and (W1−W2).

Mathematically, the noise reduction provided by the synchronous detector is described below, wherein:
W1 is the signal frequency of the magnetic dipole,
W2 is the reference clock frequency, and
W3 = W2/2.

Therefore, signals S1 and S2 at loop antenna (n=1) and (n=2) are respectively:
$S1 = s1 * \sin(W1 * t)$
$S2 = s2 * \sin(W1 * t + P)$,
where P is an arbitrary phase factor.

Demultiplexing means 56 is electrically coupled to the output of the synchronous detector. The switching operation of DEMUX 56 is sequenced by W1. Therefore, the signal comprising of segments of S1 and S2 exiting the synchronous detector are separated and returned to their respective signal channels.

The signal segments are hen individually passed through a low pass filter LP1 through LPn to complete the noise reduction process. In the preferred embodiment, the low pass filters comprise switching capacitor filters because of their excellent gain stability and cut off characteristics. Each low pass filter extrapolates the original amplitude of the modulated signal by filtering out all the high frequency modulating signal components. The low pass filters substantially reduce the detection band a very small width. By selecting filters with a long settling time, the output from each of the filters is in essence a continuous sinusoidal waveform.

Drawback of switching capacitor filters, however, results in an excessive DC offset of the resultant signal. Accordingly, it is necessary for the processor to essentially ignore the DC offset value. These wave forms are relatively noise free signals, wherein the value of the peak signal divided by two is indicative of the amplitude of the electromagnetic field at the respective antenna. In this manner, the effects of the excessive DC offset is rendered immaterial.

The processed signals at the inputs of the lowpass filters can be respectively expressed as:

$S1 * f(W2) * g(W3)$, where $f(W2) = (4/\pi) \sum_{n=0} \sin(2n + 1)W2 * t/(2n + 1)$, -continued $$g(W3) = 1/2 \left[ (4\pi) \sum_{n=0} \sin((2n+1)W3^*t)/(2n+1) + 1 \right]$$

$$= (1/2) \left[ (4/\pi) \sum_{n=0} \sin((2n+1)W2^*t/2)/(2n+1) + 1 \right],$$

therefore:

$$S1 = S1^* f(W2)^* g(W3)$$
$$= s1^* \sin(W1^*t)^* f(W2)^* g(W3)$$

$$= s1^*(8\pi)\sin(W1^*t)^* \left[ \sum_{n=0} \sin(2n+1)W2^*t/(2n+1) \right]^*$$

$$\left[ \sum_{n=0} \sin(2n+1)W2^*t/(4n+2) \right] +$$

$$s1^*(2\pi)^*\sin(W1^*t)[(\sin((2n+1)W2^*t))/(2n+1)]$$

$$= h(W2,W1) + s1^*(2/\pi)^*$$

$$\sin(W1^*t) \left[ \sum_{n=0} (\sin((2n+1)W2^*t))/(2n+1) \right]$$

where $$h(W2,W1) = s1^*(8/\pi)\sin(W1^*t)^*$$

$$\left[ \sum_{n=0} \sin(2n+1)W2^*t/(2n+1) \right]^*$$

$$\left[ \sum_{n=0} \sin(2n+1)W2^*t/(4n+2) \right],$$

$$S1 = h(W2,W1) + s1^*(2/\pi)^*$$

$$\sin(W1^*t) \left[ \sum_{n=0} (\sin((2n+1)W2^*t))/(2n+1) \right]$$

$$= h(W2,W1) + s1^*(2/\pi)^*\sin(W1^*t)^*$$

$$\left[ \sin(W2^*t) + \sum_{n=1} (\sin((2n+1)W2^*t))/(2n+1) \right],$$

and recall that $$\sin(A)^*\sin(B) = \cos(A+B) - \cos(A-B)/2$$

therefore:

$$S1 = h(W2,W1) + s1^*(1/\pi)^* ((\cos(W2+W1)t) -$$

$$\cos(W2-W1)t)) + s1^*$$

$$(2/\pi)\sin(W1^*t) \left[ \sum_{n=1} \sin((2n+1)W2^*t)/(2n+1) \right].$$

If the difference between W2 and W1 is very small, for example, two radians/second the sum of (W2+W1) is several orders of magnitude larger than (W2−W1). Therefore, after lowpass filtering, the only non-zero term is s1*(1/π)*cos−((W2−W1)t), which is readily measurable. The same condition applies to the signal from antennas 2, and the result is s2*(1/π)*cos((W2−W1)t+P). Since these last 2 expressions are slow varying sinusoidal signals, their amplitudes s1 and s2 can be found by simply converting the processed and filtered signals to digital form.

To convert the filtered Signals S1 and S2 to digital form for signal processing by processor 60, a second MUX 80, a sample and hold device 81 and an analog-to-digital convertor 82 is provided to reconstruct S1 and S2 using over-sampling techniques into digital form with great precision.

Continuous sinusoidal like signals S1 and S2 are present at MUX 80 inputs. MUX 80 converts back and forth between S1 and S2, and for each conversion, the respective signal is sampled and held and converted into digital form. By sampling each signal S1 and S2 respectively at approximately 512 times over a single cycle of 0 to 180 degrees, both S1 and S2 may be accurately and quickly reconstructed in digital form.

The reconstructed waveforms are respectively stored in random access memory (RAM) 86 and are available to the microprocessor 60 for signal processing. Once the cleaned waveforms S1 and S2 are reconstructed, the magnetic dipole's depth can easily be calculated relying on equations [1], [2], and [3] as described in detail in the background of the invention.

The present invention also provides a one button 101 self calibration feature to aid in measurement accuracy. This feature is very desirable for an instrument that is designed for use and maintained by non-technical personnel. The one button calibration is performed by putting the locator at a known distance from the dipole oscillator. When calibration button 101 is pressed, the microprocessor will start the data acquisition and processing phase to determine the amplitude of the signals from coil antenna S1 and antenna S2. From the above equations, the ratio of s1/s2 is equal to $$d'^3/(L+d')^3 \quad [4]$$

where, d' is the distance between the center of coil antenna #1 to the dipole oscillator. However, due to components aging, the gains of the coil antennas and their associated amplifiers can result in gain errors. Without correction or calibration, these errors will result in measurement errors. Since d' and L are known, the above expression is a constant. A calibration constant c is introduced, such that:

$$s1 = c^*(d'^3/(L+d')^3)^*s2. \quad [5]$$

The calibration constant c will be unity, if and only if the gain errors are zero. After c is computed, its value is stored in the non-volatile memory. Thus, for all subsequent measurement, the ratio of s1/s2 can be divided by the calibration c to correct for all the gain errors.

The calibration ratio "C" is stored in RAM 86. Subsequent depth calculations derived from equations [1], [2], and [3] as described above are then multiplied by the calibration ratio prior to being displayed.

Another advantage of the above approach is that it eliminates the need for initial calibration of the coil antenna and amplifiers combination, thus resulting in significant cost saving in the manufacturing process.

Figure 3:
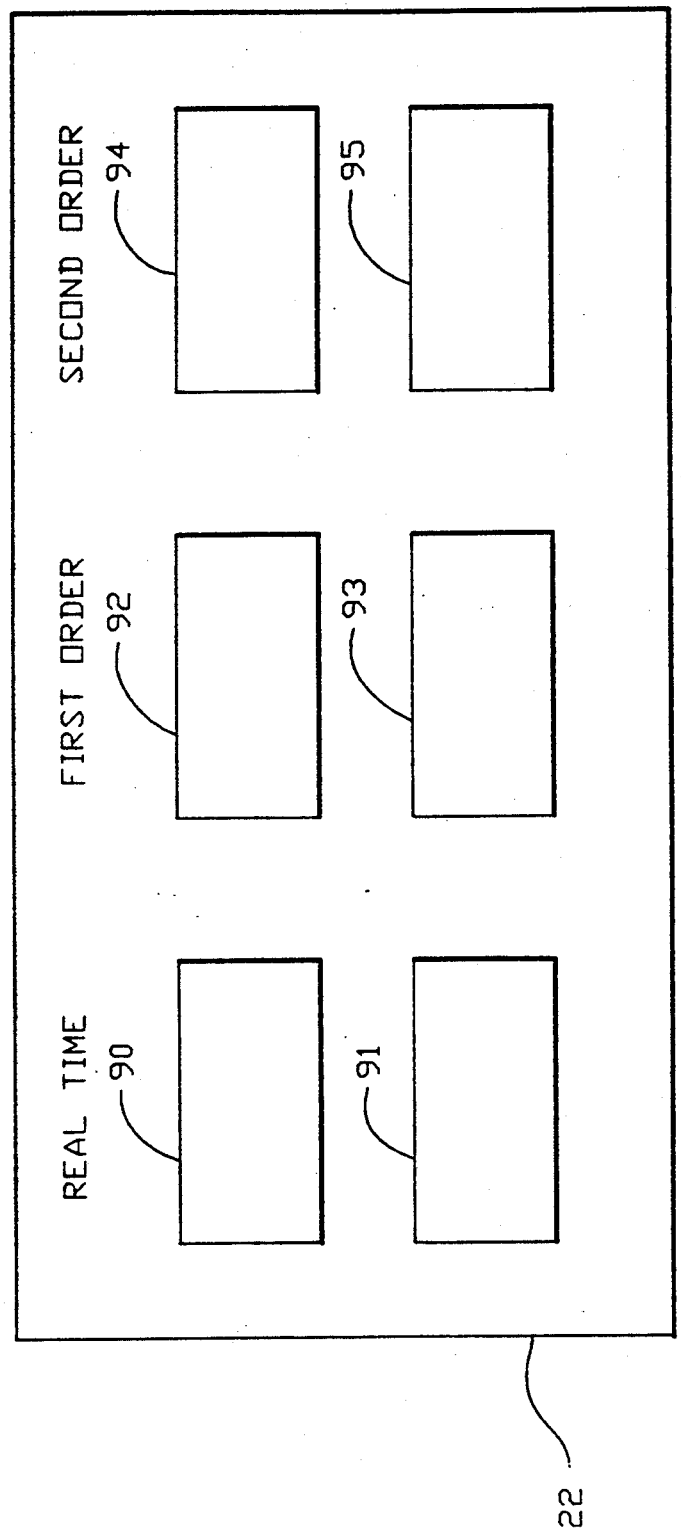
FIG. 3 is a top perspective view of the location device assembly of FIG. 1 showing a display face for displaying several orders of the magnetic field's strength and depth calculations data generated during operation of the location assembly according to the present invention.

Referring now to FIG. 3, a top perspective view of the carrying case 16 of FIG. 1 showing a display face for displaying several orders of the magnetic field's strength and depth calculations is illustrated. The display face 22 includes a real time amplitude display 90, a real time depth calculation display 91, a first time average amplitude display 92, a first time average depth calculation display 93, a second average amplitude display 94 and a second depth calculation display 95.

The purpose of the several orders of reading is to provide both real time information displays and more accurate information displays based on time averaging of the sampled signals. For example, to generate a real time magnetic field amplitude reading and associated depth calculation, the processor may time average the samples stored in memory every one half second. Accordingly, the real time amplitude display 90 and depth calculation display 91 are updated every half second. During operation, the worker relies on the real time reading to quickly pinpoint the location on the earth's surface having the strongest magnetic field.

To generate the second and third orders of displays, the processor 60 is required to time average the stored signal samples over a greater period of time. For the second order, the processor may time average over a ten second interval. Sampling over a ten second interval averages out any random noise. For the third order, the processor may time average over a twenty second interval. Sampling over twenty second intervals averages out discrepancies caused by random movement of the worker carrying the case 16.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the MUX and DE-MUX in the block diagram of FIG. 2 has been provided for two signals S, specifically S1 and S2. AS indicated above, the circuit of FIG. 2 can be provided for a greater number of signals if necessary. Also, the present invention contemplates processing multiple signals other than those representing the location of a boring machine.

What is claimed is:

1. An assembly for locating the position of an object, comprising:
   (a) first means located at said object for generating an electromagnetic field at a given frequency;
   (b) second means remote from said first means and including first and second signal receiving antennas located a fixed distance apart for simultaneously producing continuous first and second electrical input signals containing relatively high frequency noise and having AC components which are at said given frequency and which have amplitudes proportional to the strength of said field at said first and second antennas, respectively;
   (c) signal processing circuitry electrically connected to said second means and including
      (i) multiplexing means for producing a continuous train of alternating, discrete first and second signal segments from and corresponding to discrete segments of said continuous first and second signals,
      (ii) a single synchronous detector operating on said continuous train of alternating, discrete first and second signal segments at a frequency at least approximating said given frequency for substantially reducing the frequency of the AC components of said first and second signal segments,
      (iii) demultiplexing means electrically connected to said synchronous detector for separating said discrete first and said second signal segments into first and second electrical output signals containing relatively high frequency noise and having AC components corresponding to said first mentioned AC components but at a substantially reduced frequency, and
      (iv) means electrically connected to said demultiplexing means for filtering out the relatively high frequency noise from said combined first and second output signals; and
   (d) means acting on said filtered out first and second output signals for determining there from the distance between said object and said antennas.

2. An assembly according to claim 1 wherein said given frequency is at most about 1000 Hz.

3. An assembly according to claim 2 wherein said signal processing circuitry further includes a single programmable gain amplifier electrically coupled between said multiplexing means and said synchronous detector for amplifying said continuous train of alternating signals.

4. An assembly according to claim 3 wherein each of said alternating discrete first and second signal segments of said continuous train is a full cycle of its overall input signal.

5. An assembly according to claim 4 wherein said detector operates at a frequency within several hertz of said given frequency.

6. An assembly according to claim 1 wherein said filtering means comprises two switching capacitor filters to filter out noise from the first and second output signals respectively.

7. An assembly accordingly to claim 1 wherein said acting means comprises a sampling device to sample at a predetermined rate said first and second output signals, and a microprocessor to process said first and second output samples;
   said microprocessor time averaging said output signals over a first time interval to generate a real time object location and depth values;
   said microprocessor time averaging said first and second output samples over a second time interval, longer than said first time interval, to generate a second order of the object's location and depth values; and
   said microprocessor time averaging said output first and second output signals over a third time interval, longer than said second time interval, to generate a third order of the object's location and depth values.

8. The assembly of claim 7 further including a display means comprising:
   a real time display for displaying the real time location and depth values;
   a second order display for displaying the second order location and depth values; and
   a third order display for displaying the third order location and depth values.

9. The assembly of claim 8 wherein the predetermined rate equals 512 times per second.

10. An assembly for locating the position of an object, comprising:
   (a) first means located at said object for generating an electromagnetic field at a given frequency;
   (b) second means remote from said first means and including a plurality of signal receiving antennas, each located a fixed distance apart, for simultaneously producing a plurality of continuous electrical input signals containing relatively high frequency noise and having AC components which are at said given frequency and which have amplitudes proportional to the strength of said field at said respective antennas;
(c) signal processing circuitry electrically connected to said second means and including
  (i) multiplexing means for producing a continuous train of alternating, discrete signal segments from and corresponding to discrete segments of said plurality of continuous input signals,
  (ii) a single synchronous detector operating on said continuous train of alternating, discrete signal segments at a frequency at least approximating said given frequency for substantially reducing the frequency of the AC components of said plurality of signal segments,
  (iii) demultiplexing means electrically connected to said synchronous detector for converting said continuous train of alternating, discrete signal segments into a plurality of electrical output signals corresponding to the number of input signals, said plurality of electrical signals containing relatively high frequency noise and having AC components corresponding to said first mentioned AC components but at a substantially reduced frequency, and
  (iv) means electrically connected to said demultiplexing means for filtering out the relatively high frequency noise from said plurality of electrical signals; and
(d) means acting on said plurality of filtered out signals for determining therefrom the distance between said object and said plurality of antennas.

11. An assembly according to claim 10 wherein said given frequency is at most about 1000 Hz.

12. An assembly according to claim 10 wherein said signal processing circuitry includes a single programmable gain amplifier electrically coupled between said multiplexing means and said synchronous detector for amplifying said continuous train of alternating, discrete segments.

13. An assembly according to claim 10 wherein each of said alternating, discrete segments of said continuous train is approximately a full cycle of its overall input signal.

14. An assembly according to claim 13 wherein said detector operates at a frequency slightly below said given frequency.

15. An assembly of claim 10 wherein said filtering means comprises a plurality switching capacitor filters to filter out noise from the respective output signals.

16. An assembly of claim 10 wherein said acting means comprises a sampling device electrically coupled to provide a multiplicity of samples from each said output signals, and a microprocessor to process said samples; said microprocessor time averaging said multiplicity of samples from each of said output signals over several predefined time intervals, the time sampling over each predefined interval generating several orders of the object's location and depth values.

17. The assembly of claim 16 further including a display means for displaying each of the several orders of the object's location and depth values.

18. An apparatus to remove in continuous time noise from a plurality of AC signals at a given frequency, the apparatus comprising:
multiplexer means for receiving said plurality of signals, each of said signals being present on a signal channel and having signal noise of a different frequency than said given frequency, said multiplexer periodically selecting one of said signals as its output,
a single synchronous detector electrically coupled to said multiplexer output and engaged to modulate said selected signal with a reference signal to substantially reduce its given frequency;
a demultiplexer, electrically coupled to said synchronous detector and acting in cooperation with said multiplexer, returning said multiplexed and modulated signal to its said respective signal channel for signal processing;
means for filtering out said signal noise from said modulated signals electrically coupled to said demultiplexer; and
means electrically coupled to said multiplexer and demultiplexer for controlling the multiplexer and demultiplexer so that each of the plurality of signals time share the single synchronous detector.

19. An apparatus for calculating and displaying a plurality of orders of an underground object's location and depth; said apparatus comprising:
transmitting means located at said object for transmitting a homing signal;
receiving means for receiving said homing signal;
signal processing means electrically coupled to said receiving means for sampling said received homing signal over a plurality of predefined time intervals, and for each said predefined time interval, said signal processing means calculating an object location and depth value based on the signal samples taken during said corresponding predefined time interval and including a signal noise filtering assembly in which multiplexed signals pass sequentially through a demultiplexer, selected ones of a plurality of filters and a multiplexer; and
a display means coupled to said signal processing means for displaying each order of said location and depth values.

20. The apparatus according to claim 19 wherein said object is a boring machine.

* * * * *

UNITED STATES PATENT AND TRADEMARK OFFICE
CERTIFICATE OF CORRECTION

PATENT NO. : 5,070,462
DATED : December 3, 1991
INVENTOR(S) : Albert W. Chau

It is certified that error appears in the above-identified patent and that said Letters Patent is hereby corrected as shown below:

Col. 5, line 11, after "tenna is" insert ---W1---.

Col. 6, line 41, delete "hen" and insert therefor ---then---.

Col. 6, line 50, after "band" insert ---to---.

Signed and Sealed this

Twenty-third Day of March, 1993

Attest:

STEPHEN G. KUNIN

*Attesting Officer*     Acting Commissioner of Patents and Trademarks